United States Patent [19]

Blackstone et al.

[11] 3,936,922
[45] Feb. 10, 1976

[54] METHOD AND APPARATUS FOR RECOVERING INSULATION AND CONDUCTOR FROM SCRAP INSULATED WIRE

[75] Inventors: Michael Blackstone, Atlanta; Bryant K. Maddox, Carrollton; Bobby A. Rowland, Carrollton; Stanley L. Tate, Carrollton, all of Ga.

[73] Assignee: Southwire Company, Carrollton, Ga.

[22] Filed: May 16, 1974

[21] Appl. No.: 470,474

Related U.S. Application Data

[62] Division of Ser. No. 334,972, Feb. 22, 1973, Pat. No. 3,858,776.

[52] U.S. Cl................. 29/234; 81/9.5 R; 225/93.5
[51] Int. Cl.² ........................................ B23P 19/04
[58] Field of Search ................. 225/1, 2, 93.5, 96.5; 81/9.5 R, 9.5 A; 29/234; 83/15, 170

[56] References Cited
UNITED STATES PATENTS

| | | | |
|---|---|---|---|
| 2,956,717 | 10/1960 | Scharf | 225/1 |
| 3,187,739 | 6/1965 | Fresne | 225/1 |
| 3,666,596 | 5/1972 | Morton | 81/9.5 |

Primary Examiner—J. M. Meister
Assistant Examiner—Leon Gilden
Attorney, Agent, or Firm—Van C. Wilks; Herbert M. Hanegan; Stanley L. Tate

[57] ABSTRACT

Insulated wire, cable, and the like, is stripped of its insulation without damaging the wire. The insulated wire is preferably cooled to a low temperature, rendered brittle, and then continuously passed over roller means to effect fracturing and removal of the insulation. The bare wire is continuously recovered in an undamaged condition and the particles of insulation recycled where necessary. Wire straightening is optionally provided for straightening the bent wire after the insulation is removed.

9 Claims, 2 Drawing Figures

METHOD AND APPARATUS FOR RECOVERING INSULATION AND CONDUCTOR FROM SCRAP INSULATED WIRE

This is a division of application Ser. No. 334,972, filed Feb. 22, 1973, now U.S. Pat. No. 3,858,776.

FIELD OF THE INVENTION

This invention relates to method and apparatus for processing insulated wire. More particularly, this invention is directed to continuously processing insulated electrical wire for the purpose of economically recovering the underlying bare wire in an undamaged, reusable form and also for recovering the insulating material.

DESCRIPTION OF THE PRIOR ART

It is estimated that about 1.5 billion pounds of insulated electrical wire of all types are manufactured each year in the U.S. A portion of the insulated wire manufactured, e.g., about 4 percent, is deemed to be defective due to improper application of the insulation. However, the wire itself is in generally good condition and is capable of being reused provided the insulation can be removed without damaging the wire Various techniques have been proposed for stripping insulation from insulated wire. Among the suggestions made are the following:

1. Mechanical stripping, as by abrasion, shearing;
2. Thermal stripping, as by use of elevated temperature to destroy the insulation, or use of low temperature to weaken the insulation; and
3. Chemical stripping of the insulation.

Thus, U.S. Pat. No. 3,226,815 (A. Kelly) is exemplary of the mechanical approach for cutting away the insulation from the wire. There, a hand operated stripping tool with movable cutting jaws is employed for receiving and removing the insulation. U.S. Pat. No. 3,507,425 (J. Webb) and U.S. Pat. No. 2,956,717 (H. Scharf) disclose a combination of mechanical and thermal techniques for removing small, selected portions of insulation by first cooling the portion of the wire to be removed to a low temperature and thereafter applying opposed cutting blades to the cooled insulation. Exemplary of high temperature technique for decomposing the insulation is U.S. Pat. No. 3,635,454 (R. Angelo et al.). There, the chemically inert organic insulation is subjected to a stream of hot nitrogen gas to effect depolymerization of the insulation. In U.S. Pat. No. 3,635,454 there is also mentioned U.S. Pat. No. 3,331,718 which discloses a method of removing selected areas of resinous insulation by contacting the selected areas with a chemical reagent to remove the film.

Although each of the aforementioned techniques may be useful for the particular application referred to, none of these conventional techniques, however, is suitable where the wire itself is to be preserved for immediate reuse. The problem associated with the aforementioned prior art techniques is that in stripping off the insulation, the wire structure itself is altered and not in electrically undamaged condition. By "damaged" it is meant that the wire surface may be nicked or scratched by the sharp cutting blades, or, its surface condition and metalurgical condition may be altered when high temperature is used to remove the insulation. Another disadvantage of the prior art techniques is the relatively high cost of carrying out the stripping operations.

OBJECTS AND SUMMARY OF THE INVENTION

It is, therefore, a principal object of the present invention to provide method and means for overcoming the aforementioned disadvantages of the prior art techniques for removing insulation from insulated wire. It is another object of the present invention to provide method and means for continuously removing insulation from insulated wire in a manner which does not damage the wire, permitting reuse of the wire without having to reprocess the wire from a molten state. Another object of this invention is to provide method and means for recovering the insulation, e.g., preferably of the polymeric type, from insulated wire in fragmented small pieces for recycling back to an extrusion coating device or the like for insulating wire. A still further object of the present invention is to provide method and means for continuously subjecting scrap insulated wire to a low temperature fluid to embrittle the insulation and immediately thereafter, or concurrent therewith, to bend the insulated wire in order to fracture the insulation without damaging the wire. Yet another object of the present invention is to provide roller means for effecting the bending and fracturing of the embrittled insulation.

These and other objects of the present invention are accomplished by providing method and means for processing insulated wire whereby, 1. the insulated wire being processed is first cooled to a temperature where embrittlement of the insulation is effected;
2. the chilled insulated wire is continuously bent over roller means causing the insulation to fracture without damaging the wire itself; and
3. the undamaged wire and the fractured insulation are collected.

Optionally, means are provided for straightening the wire emerging from the roller means prior to collecting the bare wire on a winding reel. Whether this step is employed depends on factors such as the size, number, and configuration of the roller means employed, the degree of bend required, the insulation thickness and/or its composition, and the type of wire used.

A principal advantage of the present invention over prior art techniques is the resulting cost savings which accrue from the improved technique disclosed herein. By recovering the wire from scrap insulated wire in substantially perfect condition, the wire can be reinsulated without additional cost, except for the cost of coating. This is especially significant where the wire recovered is stranded wire or cable which has an appreciable cost input already. As will be appreciated, the present invention eliminates the need for remelting, casting, drawing, and stranding the wire prior to insulating. By eliminating the aforementioned reprocessing steps, the costs associated with these steps are saved, or at least no additional costs are expended, except for the cost of recovery. It is estimated that by using the method and means of the present invention cost savings on the order of 15 cents per pound of wire can be realized over conventional techniques which merely recover the wire for its metal content. Potential cost savings on the order of $150,000 per year can therefore be realized by the implementation of the techniques disclosed herein. This cost savings is based on processing about 1,000,000 lbs. per year of the scrap electrical wire generated. Additionally, the present invention permits recovery of the fractured insulation in a clean, reusable form. Thus, the insulation particles can be readily blended with raw material of a similar composition prior to extrusion, or the like, onto wire.

The word "wire", as used throughout this specification, is intended to include all forms of electrical conductors, including single filament wire, multifiliment wire, stranded filiments, cable, and the like.

These and other objects, features, and advantages of the present invention will become more apparent from the drawing and the description of the preferred embodiments which follow.

DESCRIPTION OF THE PREFERRED EMBODIMENTS

Figure 1:
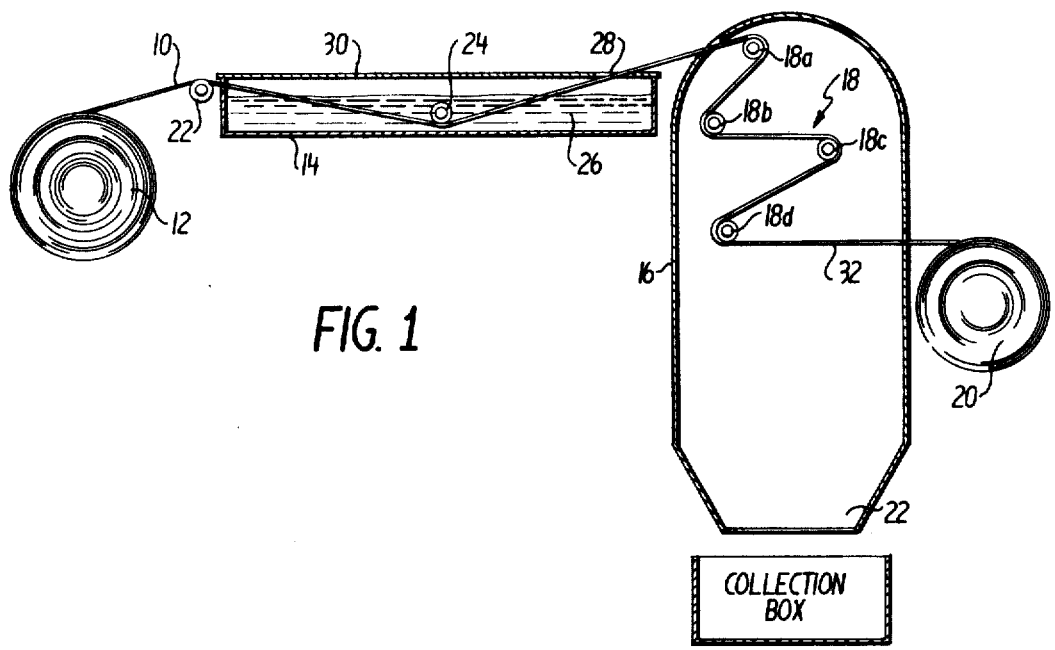
FIG. 1 is a diagrammatic representation of apparatus for carrying out a first embodiment of the method of the present invention, illustrating a two-step procedure whereby the insulated wire is first cooled and then subjected to bending forces for fracturing the insulation.

Broadly stated, the drawings illustrate, in diagrammatic form, two embodiments for processing insulated wire according to this invention. Thus, in FIG. 1, insulated wire, generally represented by reference numeral 10, emerges from the supply reel 12 into and through the cooling chamber 14 and into the housing 16 which includes roller means 18, comprising individual rollers 18a, 18b, 18c, 18d. The insulated wire 10 passes over the roller means 18 in a tortuous path arranged to provide the necessary bending forces to cause fracturing of the chilled insulation. Upon leaving the roller means 18 the now bare wire 32 exits housing 16 and is rewound on a take-up reel 20. Thus, in this particular instance the wire speed and the path length may be arranged to give the insulated wire a treatment time ranging from about 5 seconds to about 10 minutes or more and preferably from about ten seconds to about one minute. The fractured insulation particles are collected at the bottom of the housing 16, at 22. Suitable valve means, or the like (not shown), is generally provided along the bottom portion of the housing 16 for recovering the particles collected therein.

Cooling chamber 14 comprises a trough-like insulated structure conventionally fabricated for handling liquefied cryogenic refrigerants, preferably liquefied nitrogen, in a manner designed to rapidly cool the insulated wire passing therethrough, as by immersion. The chamber 14, as illustrated in FIG. 1, includes two guide wheels 22, 24, the former positioned in the vicinity of the entrance of the chamber, the latter positioned within the chamber 14 to direct the insulated wire 10 downwardly through the liquefied nitrogen 26, where it emerges at 28 in an embrittled condition. A cover 30 is provided for protection to personnel.

The embrittled insulated wire 10 emerges from cooling chamber 14 and is directed into chamber 16, over and around the four rollers 18a–18d. It will be understood that the number of rollers used and their respective orientation within the chamber 16 can be modified to suit the type of insulated wire being processed. Under certain conditions even a single roller may be sufficient to effect the necessary fracturing, provided the insulation is rendered brittle and sufficient bending forces are imposed by the roller to fracture the insulation. Where the insulation is of a particularly brittle nature, e.g., polystyrene, a large, single roller can be used. Alternatively, a single roller having means for receiving the insulated wire in more than one pass can also be employed. After the last roller, 18d, has been traversed, the insulation is substantially totally removed, and the bare wire 32, is recovered on the take-up reel 20. Conventional means for driving take-up reel 20 is provided (not shown). In the event that some particles of insulation may cling to the bare wire 32, a contacting pad, with or without lubricant, can be employed to remove these particles without damaging the wire. It should also be mentioned that under certain conditions the insulated wire being processed may be significantly deformed, requiring the additional processing step of straightening prior to being wound onto the take-up reel 20.

Figure 2:
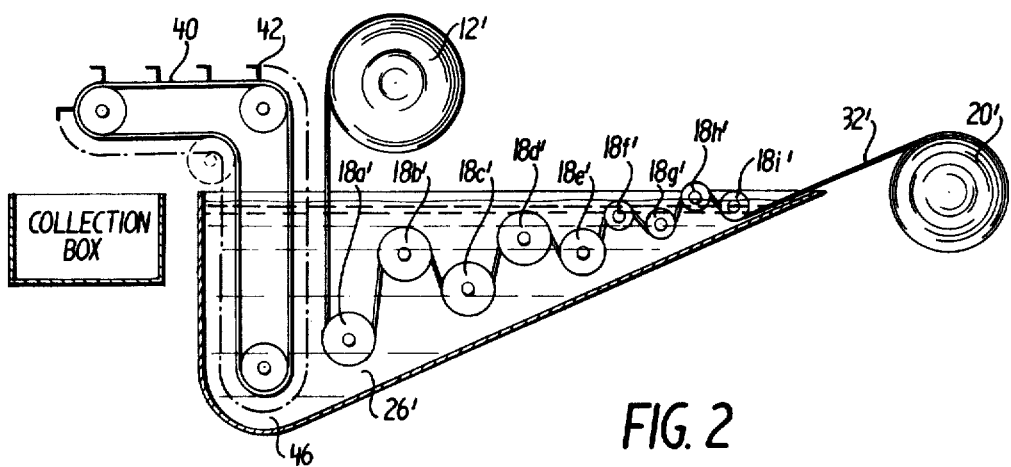
FIG. 2 is a diagrammatic representation of apparatus for carrying out a second embodiment of the method of the invention, illustrating means for concurrently cooling, fracturing, and collecting both the wire and the fractured insulation particles.

In FIG. 2, apparatus is shown for substantially simultaneously cooling and fracturing the insulation from the insulated wire being processed. In this embodiment, insulated wire 10' is fed from supply wheel 12', through the liquid nitrogen bath 26' housed in an inclined cooling chamber 14'. The cooling chamber 14' also includes a plurality of roller means 18', which, in this instance comprises nine rollers designed as 18'a–i, arranged in a tortuous path for inducing fracturing and removal of the insulation. By the time the insulating wire 10' leaves roller 18'i, all of the insulation has been removed and the wire 32' is wound and recovered on the take-up reel 20'. The particles of insulation are removed from the cooling chamber 14' at the left-hand portion of the cooling chamber 14' by a continuously moving conveyor belt 40 having a plurality of spaced scoops 42 which pick up the fractured particles of insulation which accumulate at the bottom of the incline 46 of the cooling chamber 14'. The fractured particles are deposited in a collection box for subsequent recycling, or the like.

It will be noted that the expression "insulation" is meant to include a variety of organic as well as inorganic materials commonly employed for insulating wire. Exemplary of the organic insulators are the natural and synthetic polymerics, such as polyvinyl chloride, polyethylene, polyamides, polycarbonates, polystyrene, as well as known lacquers, rubbers, e.g., neoprene, butadiene, isoprene, and the like. Of the inorganic insulating materials used, ceramics and glass may be mentioned. The electrical wire, or core, over which the insulating material is applied can be any of the commonly used metal conductors, such as copper, aluminum, and alloys thereof.

The cooling fluid employed to render the insulation material brittle is not critical and can be selected from known refrigerants such as cryogenic fluids, e.g., liquid air, liquid nylon, liquid nitrogen, etc., as well as the halocarbon refrigerants, e.g., Freons, and the like. Accordingly, when selecting the cooling medium to be used, consideration must be given to such factors as the anticipated production rate, the rate of cooling needed to process a given quantity of material to a predetermined temperature in a given period of time, the nature of the insulating material and the core wire itself. Each insulating material will have a different temperature range where embrittlement occurs. For example, the publication, *Guide to Plastics*, published by Modern Plastics (1969) lists at pages 16–17, the glass transition temperature of a variety of organic materials, some of which are mentioned hereinabove. Natural rubber, for instance, has a glass transition temperature of −72°C, whereas nylon 6 has a transition temperature of 60°C. "Glass transition temperature" is defined as the temperature region where the material undergoes change from a viscous or rubbery condition to a hard and relatively brittle condition. Also, *Guide to Plastics* states that the modulus of elasticity is a measure of the degree of brittleness. Thus, where the modulus of elasticity is about $10^{10}$ dynes/cm, or more, the material is hard and brittle or glassy and not capable of very much elastic deformation. For purposes of simplicity, it is mentioned that although the glass transition temperature for the insulating materials employed in the present invention varies from about 100° to about −100°C, it has been found desirable to universally employ liquid nitrogen or liquid air regardless of the insulating wire being processed, since rapid cooling to a low temperature, e.g., about −100°C or below, is achieved, which is adequate to give the desired results under all types of operating conditions.

Having described the invention in general terms, the following examples are set forth with reference to the drawing to more particularly describe the invention. These examples are, however, not meant to be limiting.

EXAMPLE 1

A 20 foot liquid nitrogen containing cooling chamber substantially as shown in FIG. 1 is employed to chill about 60 feet/min. No. 10 T-wire covered with 1/32 inch polyvinyl chloride insulation to below the glass transition temperature of the insulation. The insulated wire remained immersed in the liquid nitrogen for about 20 seconds and was immediately pulled over a staggered bank of six 1-inch rollers. The insulation readily fractured and the bare wire was recovered on the take-up reel in an undamaged condition.

EXAMPLE 2

15 KV 2/0 19-strand aluminum wire covered with plural layers of crosslinked polyethylene insulation, i.e., 175 mil insulation, 20 mil strand shield and 30 mil insulation shield, was first immersed in liquid nitrogen for about 30 seconds and then bent over a single 8-inch diameter roll. The insulation readily fractured and dropped from the wire leaving bare stranded wire in undamaged condition.

From the foregoing, it will be readily apparent that the concepts described herein and the means for carrying out the concepts represent an improvement over prior techniques for processing insulated wire for the purpose of economically recovering the constituents therein. It should be also appreciated that although cooling by immersion is preferred, any other suitable technique can be substituted, such as spraying, vapor contact, and the like. Moreover, where the insulation being treated is highly brittle at room temperature then the cooling step can be eliminated.

Thus, the present invention is not to be construed as being limited by the illustrated embodiments. Other embodiments can be utilized without departing from the inventive concept herein disclosed. Such embodiments are within the ability of one skilled in the art.

We claim:

1. Apparatus for continuously removing the insulating covering from the entire surface of insulated wire without damaging the wire comprising:
    means for continuously feeding wire covered with a fragmentable insulation from a supply source to a recovery station;
    means for continuously bending said wire and insulation along the length thereof and inducing stresses in said insulation in an amount sufficient to fracture said insulation;
    means for contacting said insulation covered wire with a refrigerant capable of rendering said insulation brittle positioned between said continuous feeding means and said continuous bending means; and
    means for recovering the resulting bare wire and fragmented insulation in an undamaged condition.

2. The apparatus according to claim 1 wherein said bending means comprises roller means over which said insulated wire is passed.

3. The apparatus according to claim 1, wherein said means for contacting said insulation covered wire with a refrigerant comprises chamber means for receiving liquid refrigerant having mounted therein guiding means for directing said insulated wire below the surface of said refrigerant.

4. The apparatus according to claim 3 wherein said chamber means is inclined to collect particles of fragmented insulation at its lowest portion wherein said bending means is at least partially submerged in said refrigerant.

5. The apparatus according to claim 4 wherein said bending means comprises roller means.

6. The apparatus according to claim 3 wherein said refrigerant is a cryogenic liquid taken from the group consisting essentially of liquid nitrogen, liquid air, and mixtures thereof.

7. The apparatus according to claim 4 wherein said refrigerant is a cryogenic liquid taken from the group consisting essentially of liquid nitrogen, liquid air, and mixtures thereof.

8. The apparatus according to claim 1 further including means for straightening the bare wire prior to recovering same.

9. The apparatus according to claim 7 including means for recovering the fragmented insulating material for recycling.

* * * * *